United States Patent [19]

Stephens

[11] Patent Number: 5,390,975
[45] Date of Patent: Feb. 21, 1995

[54] VEHICLE WINDOW SHADE

[75] Inventor: Randy S. Stephens, Mount Clemens, Mich.

[73] Assignee: Indian Head Industries, Inc., Charlotte, N.C.

[21] Appl. No.: 118,448

[22] Filed: Sep. 8, 1993

[51] Int. Cl.⁶ ............................................. B60J 7/10
[52] U.S. Cl. ................................... 296/211; 296/218; 49/62; 428/100
[58] Field of Search .................. 296/211, 214, 97.7, 296/218; 52/202, 203; 49/61, 62, 63, 65; 160/370.2 R; 428/100

[56] References Cited

U.S. PATENT DOCUMENTS

| 4,337,975 | 7/1982 | Tamamushi et al. | 296/218 X |
|---|---|---|---|
| 4,451,514 | 5/1984 | Hunt | 296/211 X |
| 4,513,548 | 4/1985 | Parker | 296/211 X |
| 4,607,875 | 8/1986 | McGirr | 296/97.7 |
| 4,633,215 | 12/1986 | Anders et al. | 428/100 X |
| 4,702,517 | 10/1987 | Maeda et al. | 296/214 |
| 4,722,565 | 2/1988 | Kanou et al. | 296/214 X |
| 4,790,591 | 12/1988 | Miller | 296/97.7 X |
| 4,923,245 | 5/1990 | Kuwabara | 296/214 |
| 5,183,094 | 2/1993 | Montasham et al. | 296/97.7 X |

FOREIGN PATENT DOCUMENTS

| 2491841 | 4/1982 | France | 296/214 |
|---|---|---|---|
| 32521 | 2/1984 | Japan | 296/211 |
| 100015 | 6/1984 | Japan | 296/214 |
| 2202193 | 9/1988 | United Kingdom | 296/214 |
| 8910856 | 11/1989 | WIPO | 296/97.7 |

Primary Examiner—Joseph Pape
Attorney, Agent, or Firm—Howard & Howard

[57] ABSTRACT

An improved removable shade for a vehicle moonroof, sunroof or other window assembly. The shade includes a relatively rigid panel having a size and shape configured to cover the window, a retainer button permanently attached to the window having a releasable retainer element on the opposed side and a connector button attached to the shade panel having a mating releasable retainer element, and a handle is attached to the shade panel, preferably coaxially aligned with the connector and retainer buttons. The retainer elements preferably comprise a plurality of resilient, generally linear connector elements projecting from each of the buttons having transverse end connector portions providing a releasable connection between the buttons and the connector button is preferably permanently adhesively bonded to the window.

17 Claims, 2 Drawing Sheets

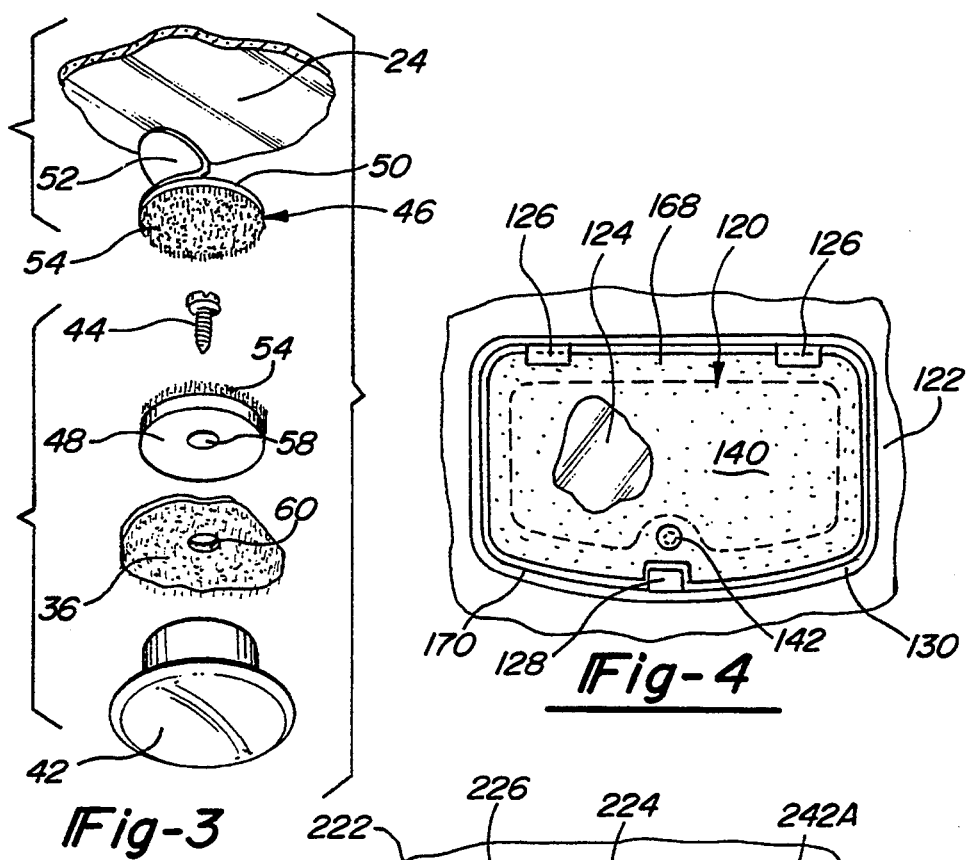

VEHICLE WINDOW SHADE

FIELD OF THE INVENTION

The present invention relates to an improved removable shade for a vehicle window, such as a "moonroof" or "sunroof" window or other window assembly which preferably is pivotally supported on hinges in a vehicle opening. The shade may remain on the window during "pop up" opening or closing of the window.

BACKGROUND OF THE INVENTION

Moonroofs or sunroofs are becoming increasingly popular and are sold both as original equipment and as an aftermarket item. Most moonroofs or sunroofs can be opened to let fresh air into the vehicle. Such roof-mounted windows are generally one of two types. The window may be mounted on tracks in the vehicle opening and the window may then be retracted partially or totally by a hydraulic power control or a window crank in some European models. A translucent or opaque shade may be mounted in adjacent parallel tracks in the vehicle opening and the shade may then be pulled over the window or the window opening. Such power operated moonroof or sunroof systems are relatively expensive and expensive to install.

Alternatively, the moonroof or sunroof may be mounted in an opening in the vehicle roof on hinges or a hinge-linkage assembly. In one embodiment, the forward marginal edge of the window is mounted on hinges and the rear marginal edge includes a handle linkage, which permits opening and tilting of the window to permit entry of fresh air into the vehicle. In other embodiments, the forward and rearward edges of the window may be supported on hinge linkages which permit the window to be opened on one or both sides. Such "manual" roof mounted windows are less expensive, but do not have tracks for a window shade. Various aftermarket shades have been proposed for manually operated moonroofs or sunroofs; however, none of the proposed designs permit easy repeated placement and removal of the shade and allow opening and closing of the roof-mounted window without removal of the shade. The removable shade for a vehicle window of this invention meets these criteria and is relatively inexpensive. It will be understood, however, that the removable shade of this invention may also be used for other window assemblies, particularly, but not exclusively, vehicle window assemblies wherein the window is hingedly supported in a vehicle opening.

SUMMARY OF THE INVENTION

As described above, the removable shade of this invention is particularly, but not exclusively, adapted to cover a vehicle window which is supported on a hinge linkage along at least one marginal edge of the window in a vehicle opening. The shade assembly includes a relatively rigid panel having a size and shape configured to generally cover the window. The shade may be translucent, but is preferably opaque, and may be covered with a finish sheet which matches or complements the interior of the vehicle. A retainer button is permanently attached to the window which has an adhesive side bonding the button to the window and a fastener side which releasably retains the window shade to the window. The shade panel includes a connector button which is secured to one side of the shade and which includes a mating releasable retainer element generally coaxially aligned with the window retainer button when the shade covers the window. As will be understood, the retainer element must permit repeated mounting of the shade panel to the window without failure. In a most preferred embodiment, the retainer elements on the buttons comprise a plurality of resilient, generally linear connector elements projecting from the buttons having generally transverse end connector portions which provide a releasable connection between the buttons. Such connectors have proven themselves in other applications and have been modified for this unique application. A suitable connector of this type is available from 3M Company under the trade name "Dual Lock." "Dual Lock" fastening systems are, however, generally used for relatively permanent attachment, although an interior trim panel attached with "Dual Lock" fasteners may be removed following application. Of course, other fastening systems, including, for example, a twist key-slot fastener system may be used, as well as Velcro TM or other hook-and-loop-type fasteners.

The shade may be removed from the window by a handle which is preferably mounted on the shade panel adjacent the connector button on the opposite side of the panel facing the passengers in the vehicle. Where an interlocking fastener system is utilized, as described above, the handle is preferably generally coaxially aligned with the buttons and the shade is removed by pulling the handle.

In one preferred embodiment of the removable shade of this invention, the shade panel includes a marginal edge which is received on a projecting lip in the vehicle opening opposite the window forming a channel-shaped recess. The hinge members in certain roof mounted windows provide suitable recesses for a properly configured panel shade. Alternatively, the shade panel may be configured to be received on the window handle in other models. Finally, the window shade may be releasably mounted on the window by using a plurality of securement buttons including, for example, at least three spaced retainer buttons adhesively secured to the window and at least three connector buttons secured to the shade panel generally in coaxial alignment with the retainer buttons on the window.

In the most preferred embodiment of the shade assembly of this invention, the window operating handle extends past the shade into the passenger compartment, such that the window can be opened or closed without removing the shade, but the shade may be easily removed by pulling the shade handle to release the connector elements and removing the shade. The shade can be repeatedly applied and removed without wear to the fastening assembly. Further, the vehicle window shade of this invention is relatively inexpensive and may be attractive in appearance. Other advantages and meritorious features of the vehicle window shade of this invention will be more fully understood from the appended claims, the following description of the preferred embodiments, and the drawings, a brief description of which follows.

BRIEF DESCRIPTION OF THE DRAWINGS

FIG. 3 is a partial exploded view of the area surrounding the handle shown in FIG. 1;

FIG. 4 is a bottom view of an alternative embodiment of the removable shade assembly of this invention;

FIG. 5 is a bottom elevational view of another alternative embodiment of the vehicle shade assembly of this invention;

FIG. 6 is a partial cross-sectional view of the shade panel; and

FIG. 7 is a partial cross-sectional view of the assembly shown in FIG. 2 with the window open.

DESCRIPTION OF THE PREFERRED EMBODIMENTS

Figure 1:
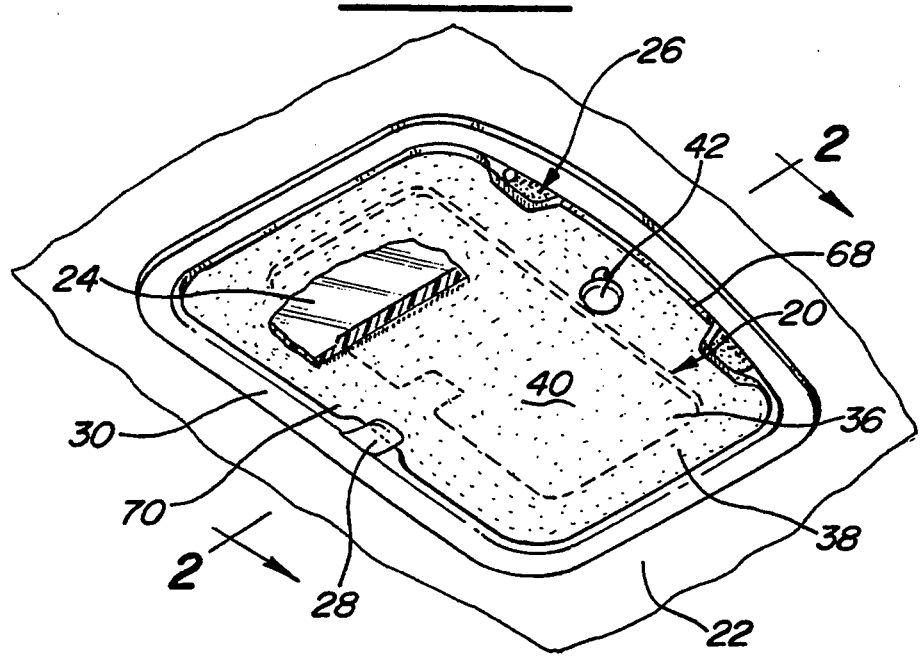
FIG. 1 is a bottom elevation of a roof-mounted window with a preferred embodiment of the removable shade assembly of this invention.
Figure 2:
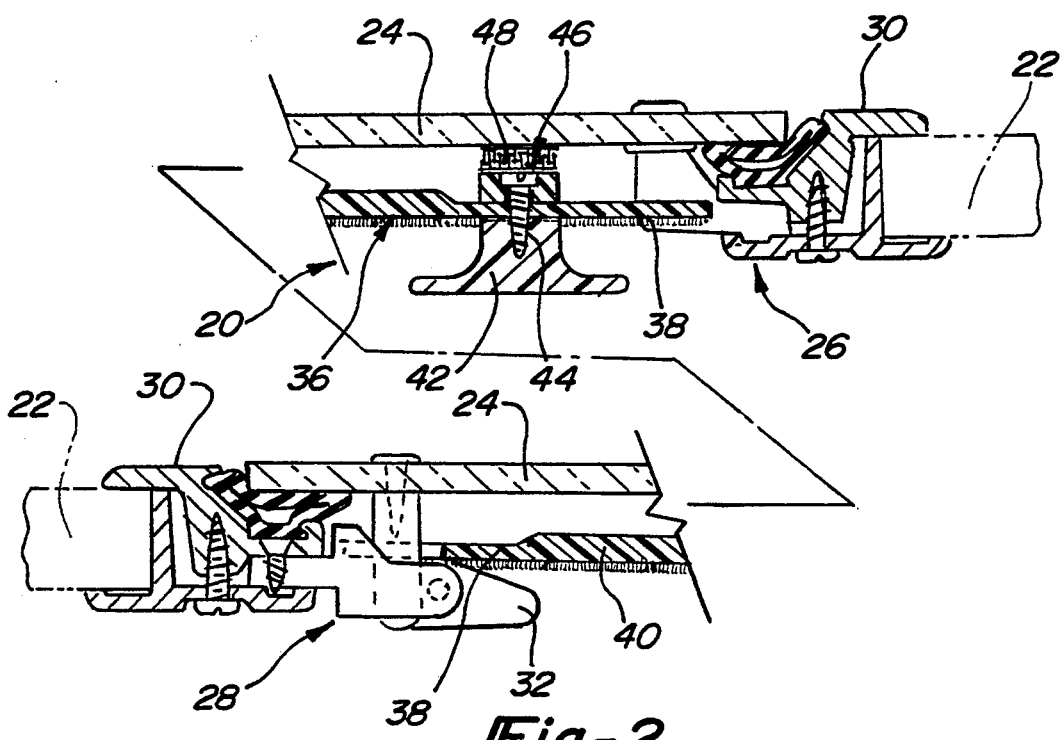
FIG. 2 is a split partial cross-sectional side view of the window and shade assembly shown in FIG. 1.

As described above, the removable window shade of this invention may be easily applied over a vehicle window to cover the window or removed and stored, when not in use. FIGS. 1 to 3 illustrate one preferred embodiment of the removable vehicle shade assembly 20 of this invention. In the disclosed embodiment, the shade 20 is applied over a conventional mechanically operated moonroof or sunroof located in a vehicle roof 22. The roof-mounted window 24 is pivotally mounted along one marginal edge by a hinge-linkage assembly 26 and a latch linkage assembly 28. In a conventional moonroof or sunroof installation, the window 24 is mounted in a frame assembly 30 and the handle may be rotated to open or close the window to admit fresh air into the vehicle, as shown in FIG. 7 and described herein below. In a typical application, the rearward edge of the window is opened and thus the lower portion of FIG. 2 illustrates the rearward portion of the window in most applications.

The preferred embodiment of the removable vehicle window shade of this invention includes a relatively rigid shade panel 36 having a size and shape configured to generally cover the window 24 as shown in FIG. 1. In the disclosed embodiments of this invention, the shade panel is contoured for increased rigidity, ease of assembly and installation. The disclosed embodiment includes a thinner outer peripheral edge 38 and a thicker mid-portion 40. Although the shade panel may be formed from various materials, one preferred material is a low density reinforced polyurethane. The contoured shaped panel disclosed in FIG. 1 may be formed by reaction injection molding (RIM). A preferred embodiment of the shade panel is shown in FIG. 6, wherein the panel 62 is formed by a conventional RIM process, wherein a glass fiber mat is inserted in the mold and a low density polyurethane is injected into the mold, forming a relatively rigid glass mat reinforced polyurethane configured panel. A cover sheet 64 may be adhesively bonded to the panel 62 wherein the cover sheet 64 is similar to or complements the interior surface of the vehicle roof 22.

The preferred embodiment of the removable shade of this invention includes a handle 42 on the "lower" side of the shade panel 36 facing the occupants of the vehicle. In the disclosed embodiment, the handle 42 is retained to the shade panel 36 by a conventional screw 44. The shade panel 36 is releasably retained to the window 24 by a connector assembly including a retainer button 46, which is permanently attached to the window 46, and a connector button 48 which is attached to the shade panel. The retainer button 46 includes adhesive on one side 50 which permanently attaches the button 46 to the window. The adhesive may be a contact or pressure sensitive adhesive which is covered by a plastic cover sheet 52 prior to application to the window 24. As will be understood, the adhesive must be able to withstand substantial variations in temperature and exposure to direct sun. A suitable adhesive is 400 Acrylic Foam, available from 3M Company.

In the most preferred embodiments of the removable vehicle window shade of this invention, the retainer and connector buttons 46 and 48, respectively, are releasably connected by connector elements 54 respectively. The most preferred embodiment of the connector elements comprise a plurality of resilient, generally linear connector elements projecting from each of the buttons, as best shown in FIG. 3. The connector elements include generally transverse end connector portions which releasably interconnect the retainer and connector buttons. Suitable connector elements are available from the 3M Company and sold under the trade name "Dual Lock." The "Dual Lock" connector elements include mushroom-shaped end portions which releasably interconnect the retainer and connector buttons. It has been found that using one button having 400 connector elements per square inch and the other connector element having 250 connector elements per square inch provides a strong, but easily releasable connection between the retainer and connector buttons. As described above, however, other fastening systems may also be utilized.

In the disclosed embodiment, the retainer button 48 is attached to the shade panel 36 by the screw 44 which retains the handle or knob 42 to the opposite side of the panel 36. Coaxially aligned apertures 58 and 60 are provided in the connector button 48 and shade panel 36 respectively which receive the screw 44. The handle or knob 42 is thus coaxially aligned with the retainer and connector buttons 46 and 48, such that a pulling force applied to the knob 42 will be transmitted directly through the buttons, to pull the connector elements 46 and 48 apart during removal of the shade 20 from the vehicle window. This arrangement is important to avoid applying a lateral force, which would not be as effective in this type of connector assembly. The retainer and connector buttons 46 and 48 thus releasably or removably attach the shade panel 36 over the window 24 as shown in the top portion of FIG. 2. In the embodiment of the shade assembly shown in FIG. 1, the handle 42 and connector assembly is located adjacent one side edge 68 of the shade panel and the opposite side edge 70 is supported on the latch handle 32 of the latch linkage assembly 28 as best shown in the lower portion of FIG. 2.

As will be understood, however, the preferred method of attachment of the removable vehicle window shade of this invention will depend upon the configuration of the vehicle window. In the embodiment of the vehicle window shade assembly 120 shown in FIG. 4, the handle 142 and the coaxially aligned retainer and connector buttons (not shown) are located adjacent the marginal edge 170 which is located adjacent the latch linkage assembly 128, which is the opposite side from the embodiment shown in FIG. 1. The elements of the removable vehicle shade assembly 120 are numbered in the same sequence as the shade assembly 20 shown in FIG. 1 and may be the same, except as described herein. As described, the retainer and connector buttons which are coaxially aligned with the handle 142 (not shown) releasably attach the window shade 120 over the window 124. In the embodiment shown in FIG. 4, however, the marginal edge 168 of the panel is received over the hinge-linkage assemblies 126, releasably retaining this marginal edge over the window. A channel-shaped recess is provided between the hinge linkage assemblies and the window which receives and supports the marginal edge 168 of the shade panel in this installation.

Where a suitable channel is not provided by either the hinge or latch linkage assemblies, the shade panel 220 may be releasably attached to the window 224 by retainer and connector buttons alone, as shown in FIG. 5. Again, the elements of the vehicle shade assembly 220 are numbered in the same sequence as the assembly shown in FIGS. 1 and 4. This embodiment of the removable vehicle shade assembly, however, includes three handle retainer assemblies, 224A, 224B and 224C. As described above, particularly in regard to FIG. 3, retainer and connector buttons are attached to the window and shade panel, respectively, in coaxial alignment, releasably attaching the shade 220 to the window 224, as described above. The removable vehicle shade assembly 220 may be otherwise identical to the shade assembly described above in regard to FIGS. 1 and 4.

As best shown in FIG. 7, the removable vehicle window shade assembly 20 may be left on the window 24 as the window is "opened" and "closed." The shade assembly does not interfere with the opening and closing of the window, but may be easily removed when desired. Thus, the removable shade for a vehicle window of this invention achieves the objects of this invention, including a relatively inexpensive window shade which may be easily and repeatedly applied over the window and which is relatively inexpensive. Further, the vehicle shade of this invention may be left on the window during opening and closing and does not interfere with the entry of fresh air through the open window. As will be understood, however, various modifications may be made to the removable vehicle window shade of this invention without departing from the purview of the appended claims. For example, the shade may be formed of various materials, including a translucent plastic and the shade may be designed for use with other window assemblies. Having thus described the removable vehicle window shade of this invention, the invention is claimed, as follows.

What is claimed is:

1. A removable shade for a vehicle window, said vehicle window incorporated into a window assembly including hinges, said vehicle window pivotally supported on said hinges along a margin thereof in a vehicle opening, said shade including a relatively rigid panel having a size and shape configured to generally cover said window and said shade extending between two edges, a retainer button substantially permanently attached to said vehicle window, said retainer button including a first side having adhesive thereon adhesively bonding said button to said window and a second opposed side having a releasable retainer element, a connector button secured on one side of said shade panel adjacent one of said edges, and including a face having a mating releasable retainer element generally coaxially aligned with said retainer button when said shade panel covers said window, said retainer elements of said buttons releasably retaining said shade panel on said window, the other of said edges also being supported by said window assembly, and said shade panel movable with said window upon pivotal movement of said window about said hinges to open and close said window; and said shade including a handle attached to said shade panel adjacent to said connector button on a side of said panel opposite said one side of said shade panel, said handle being attached to said shade panel generally coaxially aligned with said buttons, and said connector elements comprising a plurality of resilient, generally linear connector elements projecting from said buttons and said connector elements associated with at least one of said connector button and said retainer button having a generally transverse end connector portion, said end connector portions providing a reliable connection between said buttons.

2. A removable shade for a vehicle window, said vehicle window incorporated into a window assembly including a hinge, said vehicle window pivotally supported on said hinge along a marginal edge thereof in a vehicle opening, said shade including a relatively rigid panel having a size and shape configured to generally cover said window in said vehicle opening and extending between two edges, a retainer button attached to said window, said retainer button including a first side having adhesive thereon adhesively bonding said button to said window and a second opposed side having a releasable retainer element, a connector button secured on one side of said shade panel adjacent one of said edges, and including a side having a mating releasable retainer element generally coaxially aligned with said retainer button when said shade panel covers said window, a handle attached to said shade panel on a side of said shade panel opposite said one side, said handle projecting from said shade panel adjacent to said buttons, and the other edge of said shade panel being a marginal edge configured to be received in a channel-shaped recess adjacent to said window, said retainer elements of said buttons and said channel-shaped recess releasably retaining said shade panel on said window and said shade panel movable with said window upon pivotal movement of said window about said hinge to open and close said window; and said connector elements comprising a plurality of resilient generally linear connector elements projecting from said buttons, and said connector elements associated with one of said connector and said retainer button having a generally transverse end connector portion providing a releasable connection between said buttons, and said handle being generally coaxially aligned with said buttons.

3. The removable shade for a vehicle window as defined in claim 2, characterized in that said panel comprises a relatively rigid self-supporting sheet of fiberglass reinforced plastic having a finish layer bonded thereto.

4. The removable shade for a vehicle window as defined in claim 3, characterized in that said panel is formed into a contoured shape to reinforce said panel and said panel being relatively rigid.

5. A removable shade for a vehicle window, said vehicle window incorporated into a window assembly which allows opening and closing said window, said vehicle window supported in a vehicle opening, said shade including a relatively rigid panel having a size and shape configured to generally cover said window, and extending between two edges, a retainer button substantially permanently attached to said window, said retainer button including a first side having adhesive thereon adhesively bonding said button to said window and a second opposed side having retainer elements thereon, a connector button secured on one side of said panel adjacent one of said edges, and including a face having mating retainer elements generally coaxially aligned with said retainer button when said shade panel covers said window, said retainer elements comprising a plurality of resilient, generally linear connector elements projecting from said buttons having a generally transverse end connector portion providing a releasable connection between said buttons, and a handle attached to said shade panel adjacent said button on a side of said panel opposite said one side, said connector buttons releasably retaining said shade panel on said window, and the other of said edges being supported by said window assembly and said shade panel movable with said window upon opening and closing of said window; and said handle being generally coaxially aligned with said button.

6. The removable shade for a vehicle window as defined in claim 5, characterized in that said shade panel comprises fiber reinforced plastic having a contoured shape which strengthens said panel.

7. The removable shade for a vehicle window as defined in claim 1, wherein a second support element in addition to said retainer button supports said other of said edges.

8. The removable shade for a vehicle window as defined in claim 2, wherein a second support element in addition to said retainer button supports said other of said edges.

9. The removable shade for a vehicle window as defined in claim 5, wherein a second support element in addition to said retainer button supports said other of said edges.

10. The removable shade for a vehicle window as defined in claim 7, characterized in that said panel other edge is a marginal edge which is received between a projecting lip in said vehicle opening and said window, said shade panel marginal edge and said button releasably retaining said shade panel on said window.

11. The removable shade for a vehicle window defined in claim 10, wherein said projecting lip is defined by said hinges.

12. The removable shade for a vehicle window as defined in claim 1, characterized in that said shade panel comprising a fiberglass reinforced plastic panel having a finish cloth bonded thereon.

13. The removable shade for a vehicle window as defined in claim 7, characterized in that said shade includes at least three spaced retainer buttons substantially permanently attached to said vehicle window and said shade panel includes at least three spaced connector buttons secured on said one face of said shade panel substantially coaxially aligned with said retainer buttons, said buttons releasably attaching said shade panel over said window.

14. The removable shade for a vehicle window as defined in claim 9, characterized in that said shade panel other edge a marginal edge which is received beneath a lip opposite said window in said vehicle opening, said shade panel marginal edge and said buttons releasably retaining said shade panel on said window.

15. The removable shade for a vehicle window as defined in claim 9, characterized in that said shade includes at least three spaced retainer buttons substantially permanently attached to said vehicle window and said shade panel including at least three spaced connector buttons substantially coaxially aligned with said retainer buttons, said buttons releasably attaching said shade panel over said window.

16. The removable shade for a vehicle window as defined in claim 1, wherein said connector elements on both of said buttons have generally transverse end connector portions.

17. The removable shade for a vehicle window as defined in claim 2, wherein said connector elements on both of said but ms have generally transverse end connector portions.

* * * * *

UNITED STATES PATENT AND TRADEMARK OFFICE
CERTIFICATE OF CORRECTION

PATENT NO. : 5,390,975
DATED : February 21, 1995
INVENTOR(S) : Randy S. Stephens It is certified that error appears in the above-indentified patent and that said Letters Patent is hereby corrected as shown below:

In Claim 1, column 6, line 12 of the Patent, delete "reliable" and insert --releasable--

In Claim 2, column 6, line 44 of the Patent, after "with" insert --at least--

In Claim 17, column 8, line 39 of the Patent, delete "but ms" and insert --buttons--

Signed and Sealed this

Thirtieth Day of May, 1995

Attest:

BRUCE LEHMAN

Attesting Officer    Commissioner of Patents and Trademarks